(12) United States Patent
Yamada et al.

(10) Patent No.: US 10,849,114 B2
(45) Date of Patent: Nov. 24, 2020

(54) BASE STATION APPARATUS, TERMINAL APPARATUS, AND COMMUNICATION METHOD

(71) Applicant: SHARP KABUSHIKI KAISHA, Sakai (JP)

(72) Inventors: Ryota Yamada, Sakai (JP); Jungo Goto, Sakai (JP); Osamu Nakamura, Sakai (JP); Takashi Yoshimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 68 days.

(21) Appl. No.: 15/780,452

(22) PCT Filed: Sep. 15, 2016

(86) PCT No.: PCT/JP2016/077214
§ 371 (c)(1),
(2) Date: May 31, 2018

(87) PCT Pub. No.: WO2017/094320
PCT Pub. Date: Jun. 8, 2017

(65) Prior Publication Data
US 2018/0368111 A1 Dec. 20, 2018

(30) Foreign Application Priority Data
Dec. 1, 2015 (JP) .................................. 2015-234437

(51) Int. Cl.
*H04W 72/04* (2009.01)
*H04W 92/10* (2009.01)
(Continued)

(52) U.S. Cl.
CPC ........ *H04W 72/042* (2013.01); *H04B 7/0452* (2013.01); *H04B 7/0626* (2013.01);
(Continued)

(58) Field of Classification Search
CPC ... H04W 72/042; H04W 92/10; H04W 48/08; H04W 72/04; H04W 52/346;
(Continued)

(56) References Cited

U.S. PATENT DOCUMENTS

2016/0219529 A1  7/2016  Benjebbour et al.
2016/0330695 A1  11/2016 Benjebbour et al.
(Continued)

FOREIGN PATENT DOCUMENTS

JP    2015-136031 A    7/2015
WO    2015/029729 A1   3/2015

OTHER PUBLICATIONS

Innovative Technology Lab Co: "DL Control Signalling and CSI Enhancement for Multiuser Superposition Transmission", R1-157312, 3GPP TSG RAN WG1 Meeting #83, Anaheim, USA, Nov. 15-22, 2015.
(Continued)

*Primary Examiner* — Jae Y Lee
(74) *Attorney, Agent, or Firm* — ScienBiziP, P.C.

(57) ABSTRACT

To provide a base station apparatus, a terminal apparatus, and a communication method where the terminal efficiently learns information of an interference signal and reduces interference in a reception process to thereby enhance throughput. Provided is a terminal apparatus for communicating with a base station apparatus, the terminal apparatus including: a higher layer processing unit for which multiuser superposition transmission (MUST) is configured by the base station apparatus; and a reception unit configured to receive, in a case that the MUST is configured, downlink control information including any of power allocation information, presence/absence of interference, and indication of whether the terminal apparatus is a near-UE or a far-UE or a superposition transmission method.

7 Claims, 8 Drawing Sheets

(51) Int. Cl.
  *H04W 48/08* (2009.01)
  *H04W 52/34* (2009.01)
  *H04W 52/18* (2009.01)
  *H04W 52/14* (2009.01)
  *H04W 52/24* (2009.01)
  *H04B 7/0452* (2017.01)
  *H04B 7/06* (2006.01)
  *H04L 5/00* (2006.01)

(52) U.S. Cl.
  CPC ......... *H04B 7/0639* (2013.01); *H04L 5/0048* (2013.01); *H04L 5/0055* (2013.01); *H04W 48/08* (2013.01); *H04W 52/143* (2013.01); *H04W 52/18* (2013.01); *H04W 52/243* (2013.01); *H04W 52/346* (2013.01); *H04W 72/04* (2013.01); *H04W 92/10* (2013.01)

(58) Field of Classification Search
  CPC . H04W 52/18; H04W 52/143; H04W 52/243; H04B 7/0452; H04B 7/0626; H04B 7/0639; H04L 5/0048; H04L 5/0055
  See application file for complete search history.

(56) References Cited

U.S. PATENT DOCUMENTS

2018/0160372 A1* 6/2018 Benjebbour .......... H04W 24/10
2018/0262288 A1* 9/2018 Gao ......................... H04J 7/00

OTHER PUBLICATIONS

Mediatek Inc: "Potential Enhancements for MUST", R1-155701, 3GPP TSG RAN WG1 Meeting #82bis, Malmö, Sweden, Oct. 5-9, 2015.
MediaTek Inc., Study on Downlink Multiuser Superposition Transmission for LTE, 3GPP TSG RAN Meeting #67, Mar. 2015.

* cited by examiner

| VALUE | POWER RATIO |
|-------|-------------|
| 0 | 1.0 |
| 1 | 0.1 |
| 2 | 0.15 |
| 3 | 0.2 |
| 4 | 0.25 |
| 5 | 0.3 |
| 6 | 0.35 |
| 7 | 0.4 |

FIG. 2

| VALUE | POWER RATIO |
|---|---|
| 0 | 1.0 |
| 1 | 0.1 |
| 2 | 0.15 |
| 3 | 0.2 |
| 4 | 0.25 |
| 5 | 0.3 |
| 6 | 0.35 |
| 7 | Far-UE |

FIG. 3

| VALUE | POWER RATIO |
|---|---|
| 0 | 1.0 |
| 1 | 0.1 |
| 2 | 0.2 |
| 3 | 0.3 |
| 4 | 0.4 |
| 5 | 0.8 |
| 6 | 0.7 |
| 7 | 0.6 |

FIG. 4

| VALUE | POWER RATIO |
|---|---|
| 0 | 1.0 |
| 1 | 0.1 |
| 2 | 0.15 |
| 3 | 0.2 |
| 4 | 0.25 |
| 5 | 0.3 |
| 6 | 0.35 |
| 7 | KNOWN MAPPING |

FIG. 5

TABLE FOR NEAR-UE

| VALUE | POWER RATIO |
|---|---|
| 0 | 1.0 |
| 1 | 0.1 |
| 2 | 0.2 |
| 3 | 0.3 |

FIG. 6A

TABLE FOR FAR-UE

| VALUE | POWER RATIO |
|---|---|
| 0 | 1.0 |
| 1 | 0.9 |
| 2 | 0.8 |
| 3 | 0.7 |

FIG. 6B

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system such as Long Term Evolution (LTE) or LTE-Advanced (LTE-A) standardized by the Third Generation Partnership Project (3GPP), the communication area can be widened by taking a cellular configuration in which multiple areas covered by base station apparatuses (base stations, transmission stations, transmission points, downlink transmission devices, uplink reception devices, a group of transmit antennas, a group of transmit antenna ports, component carriers, and/or eNodeB) or transmission stations equivalent to the base station apparatuses are arranged in a cellular (Cell) form. In such a cellular configuration, frequency efficiency can be improved by using the same frequency among neighbor cells or sectors.

To increase system capacity, enhance communication opportunity, and the like, a technique in which multiple terminal apparatuses are non-orthogonally multiplexed to perform transmission, multi-user transmission based on superposition coding, and the like are studied in these years. Since multiple terminal apparatuses are non-orthogonally multiplexed to perform transmission by a base station apparatus, inter-user interference occurs. For this reason, each terminal apparatus needs to cancel or suppress inter-user interference. The above point is described in NPL 1. Examples of a technique to cancel the inter-user interference are interference canceller for canceling interference of an interference signal, Maximum Likelihood Detection, and the like.

CITATION LIST

Non-Patent Literature

NPL 1: "Study on Downlink Multiuser Superposition Transmission for LTE," 3GPP TSG RAN Meeting #67, March 2015.

DISCLOSURE OF THE INVENTION

Problems to be Solved by the Invention

However, in order for a terminal apparatus to cancel or suppress inter-user interference, the terminal apparatus needs to learn information of an interference signal, such as parameters for demodulation/decoding of an interference signal.

The present invention has been made in consideration of the above circumstances, and an object of the present invention is to provide a base station apparatus, a terminal apparatus, and a communication method where the terminal efficiently learns information about an interference signal and reduces interference in a reception process to thereby enhance throughput.

Means for Solving the Problems

To address the above-mentioned problem, a base station apparatus, a terminal apparatus, and a communication method according to aspects of the present invention are configured as follows.

A terminal apparatus according to an aspect of the present invention is a terminal apparatus for communicating with a base station apparatus, the terminal apparatus including: a higher layer processing unit for which multiuser superposition transmission (MUST) is configured by the base station apparatus; and a reception unit configured to receive, in a case that the MUST is configured, downlink control information including any of power allocation information, presence/absence of interference, and indication of whether the terminal apparatus is a near-UE or a far-UE or a superposition transmission method.

In the terminal apparatus according to the aspect of the present invention, the power allocation information, presence/absence of interference, and whether the terminal apparatus is the near-UE or the far-UE are identified in one table.

In the terminal apparatus according to the present invention, the power allocation information is a power ratio for the near-UE and a power ratio for the far-UE.

In the terminal apparatus according to the aspect of the present invention, the power allocation information, presence/absence of interference, and the superposition transmission method are identified in one table.

In the terminal apparatus according to the aspect of the present invention, different tables are referred to depending on whether the near-UE or the far-UE is indicated, to identify the power allocation information and presence/absence of interference.

A base station apparatus according to an aspect of the present invention is a base station apparatus for communicating with a terminal apparatus, the base station apparatus including: a higher layer processing unit configured to configure multiuser superposition transmission (MUST) for the terminal apparatus; and a transmission unit configured to transmit, in a case of configuring the MUST, downlink control information including any of power allocation information, presence/absence of interference, and indication of whether the terminal apparatus is a near-UE or a far-UE or a superposition transmission method.

A communication method according to an aspect of the present invention is a communication method for a terminal apparatus for communicating with a base station apparatus, the communication method including the steps of: accepting a configuration of multiuser superposition transmission (MUST) by the base station apparatus; and receiving, in a case that the MUST is configured, downlink control information including any of power allocation information, presence/absence of interference, and indication of whether the terminal apparatus is a near-UE or a far-UE or a superposition transmission method.

A communication method according to an aspect of the present invention is a communication method for a base station apparatus for communicating with a terminal apparatus, the communication method including the steps of: configuring multiuser superposition transmission (MUST) for the terminal apparatus; and transmitting, in a case of configuring the MUST, downlink control information including any of power allocation information, presence/absence of interference, and indication of whether the terminal apparatus is a near-UE or a far-UE or a superposition transmission method.

Effects of the Invention

According to the present invention, interference signals can be reduced, and hence the throughput and the communication opportunity of the terminal apparatus can be enhanced.

BRIEF DESCRIPTION OF THE DRAWINGS

FIG. 2 is a table illustrating an example of power ratios according to the present embodiment.

FIG. 3 is a table illustrating an example of power ratios according to the present embodiment.

FIG. 4 is a table illustrating an example of power ratios according to the present embodiment.

FIG. 5 is a table illustrating an example of power ratios according to the present embodiment.

FIGS. 6A and 6B are tables illustrating examples of power ratios according to the present embodiment.

MODE FOR CARRYING OUT THE INVENTION

A communication system according to a present embodiment includes a base station apparatus (a transmission device, cells, serving cells, a transmission point, a group of transmit antennas, a group of transmit antenna ports, component carriers, and/or eNodeB) and terminal apparatuses (a terminal, a mobile terminal, a reception point, a reception terminal, a reception unit, a group of receive antennas, a group of receive antenna ports, and/or UE).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
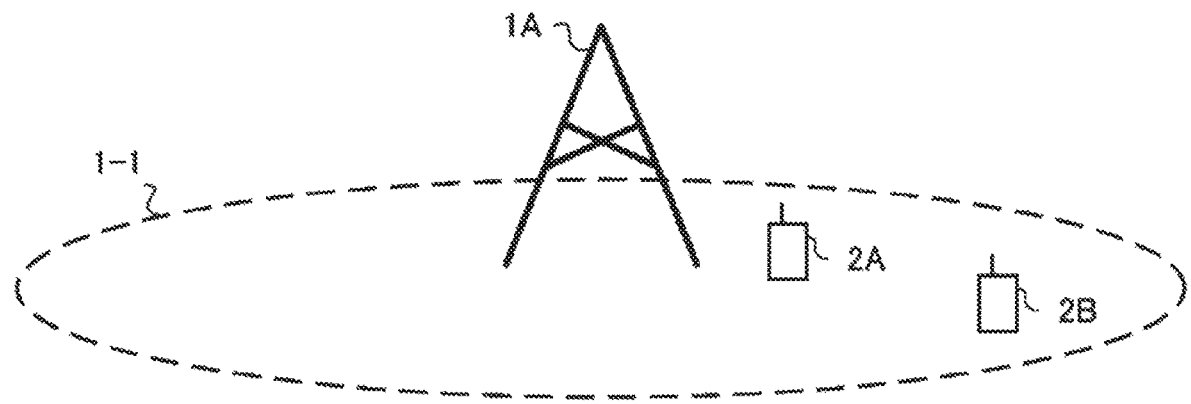
FIG. 1 is a diagram illustrating an example of a communication system according to a present embodiment.

FIG. 1 is a diagram illustrating an example of a communication system according to the present embodiment. As illustrated in FIG. 1, the communication system according to the present embodiment includes a base station apparatus 1A and terminal apparatuses 2A and 2B. Coverage 1-1 is a range (communication area) in which the base station apparatus 1A can connect to the terminal apparatuses. The terminal apparatuses 2A and 2B are also collectively referred to as a terminal apparatus 2.

In FIG. 1, the following uplink physical channels are used for uplink radio communication from the terminal apparatus 2A to the base station apparatus 1A. The uplink physical channels are used for transmission of information output from higher layers.

Physical Uplink Control Channel (PUCCH)
Physical Uplink Shared Channel (PUSCH)
Physical Random Access Channel (PRACH)

Here, the PUCCH is used for transmission of Uplink Control Information (UCI). The Uplink Control Information includes a positive acknowledgement (ACK) or a negative acknowledgement (NACK) (ACK/NACK) for downlink data (a downlink transport block or a Downlink-Shared Channel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) specifying a suited spatial multiplexing number, a Precoding Matrix Indicator (PMI) specifying a suited precoder, a Channel Quality Indicator (CQI) specifying a suited transmission rate, and the like.

The Channel Quality Indicator (hereinafter, referred to as a CQI value) can be a suited modulation scheme (e.g., QPSK, 16QAM, 64QAM, 256QAM, or the like) and a suited coding rate in a prescribed band (details of which will be described later). The CQI value can be an index (CQI Index) determined by the above change scheme, coding rate, and the like. The CQI value can take a value determined beforehand in the system.

The Rank Indicator and the Precoding Quality Indicator can take the values determined beforehand in the system. Each of the Rank Indicator, the Precoding Matrix Indicator, and the like can be indices determined based on the spatial multiplexing number, Precoding Matrix information, or the like. Note that values of the Rank Indicator, the Precoding Matrix Indicator, and the channel quality indicator (CQI) are collectively referred to as a CSI value.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the Uplink Control Information only.

PUSCH is used to transmit an RRC message. The RRC message is information/signal that is processed in a Radio Resource Control (RRC) layer. Further, PUSCH is used to transmit a MAC Control Element (CE). Here, MAC CE is information/signal that is processed (transmitted) in a Medium Access Control (MAC) layer.

For example, a power headroom may be included in MAC CE to be reported via PUSCH. In other words, a MAC CE field may be used to indicate the level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers but is used by the physical layer. Here, the Uplink Reference Signal includes a Demodulation Reference Signal (DMRS) and a Sounding Reference Signal (SRS).

The DMRS is associated with transmission of the PUSCH or the PUCCH. For example, the base station apparatus 1A uses DMRS in order to perform channel compensation of PUSCH or PUCCH. The SRS is not associated with the transmission of the PUSCH or the PUCCH. For example, the base station apparatus 1A uses SRS to measure an uplink channel state.

In FIG. 1, the following downlink physical channels are used for the downlink radio communication from the base station apparatus 1A to the terminal apparatus 2A. The downlink physical channels are used for transmission of information output from higher layers.

Physical Broadcast Channel (PBCH)
Physical Control Format Indicator Channel (PCFICH)
Physical Hybrid automatic repeat request Indicator Channel (PHICH, HARQ indicator channel)
Physical Downlink Control Channel (PDCCH)
Enhanced Physical Downlink Control Channel (EPDCCH)
Physical Downlink Shared Channel (PDSCH)

PBCH is used for broadcasting a Master Information Block (MIB, a Broadcast Channel (BCH)) that is shared by the terminal apparatuses. PCFICH is used for transmission of information indicating a region (e.g., the number of OFDM symbols) to be used for transmission of PDCCH.

PHICH is used for transmission of ACK/NACK with respect to uplink data (transport block, codeword) received by the base station apparatus 1A. In other words, PHICH is used for transmission of a HARQ indicator (HARQ feedback) indicating ACK/NACK with respect to the uplink data. Note that ACK/NACK is also called HARQ-ACK. The terminal apparatus 2A reports received ACK/NACK to a higher layer. ACK/NACK refers to ACK indicating a successful reception, NACK indicating an unsuccessful reception, and DTX indicating that no corresponding data is present. In a case that PHICH for uplink data is not present, the terminal apparatus 2A reports ACK to a higher layer.

PDCCH and EPDCCH are used for transmission of Downlink Control Information (DCI). Here, multiple DCI formats are defined for transmission of the downlink control information. In other words, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, a TPC command for PUCCH, and the like. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, a TPC command for PUSCH, and the like. The DCI format for the uplink is also referred to as uplink grant (or uplink assignment).

Here, the DCI format for the uplink may be used to request Channel State Information (CSI) for the downlink (also referred to as reception quality information) (CSI request). The Channel State Information refers to the Rank Indicator (RI) indicating a suited spatial multiplexing number, the Precoding Matrix Indicator (PMI) indicating a suited precoder, the Channel Quality Indicator (CQI) indicating a suited transmission rate, Precoding type Indicator (PTI), and the like.

The DCI format for the uplink can be used for a configuration indicating an uplink resource to which a CSI feedback report is mapped, the channel state information (CSI) feedback report being fed back to the base station apparatus by the terminal apparatus. For example, the CSI feedback report can be used for a configuration indicating an uplink resource for periodically reporting Channel State Information (Periodic CSI). The CSI feedback report can be used for a mode configuration (CSI report mode) to periodically report the Channel State Information.

For example, the CSI feedback report can be used for a configuration indicating an uplink resource to report aperiodic Channel State Information (Aperiodic CSI). The CSI feedback report can be used for a mode configuration (CSI report mode) to aperiodically report the Channel State Information. The base station apparatus can configure either the periodic CSI feedback report or the Aperiodic CSI feedback report. Alternatively, the base station apparatus can configure both the Periodic CSI feedback report and the Aperiodic CSI feedback report.

The DCI format for the uplink can be used for a configuration indicating the type of the CSI feedback report to be fed back to the base station apparatus by the terminal apparatus. Examples of the type of the CSI feedback report include wideband CSI (e.g., Wideband CQI), narrowband CSI (e.g., Subband CQI), and the like.

In a case that a PDSCH resource is scheduled by using the downlink assignment, the terminal apparatus receives downlink data on the scheduled PDSCH. In a case that a PUSCH resource is scheduled by using the uplink grant, the terminal apparatus transmits uplink data and/or uplink control information of the scheduled PUSCH.

PDSCH is used for transmission of downlink data (downlink transport block, DL-SCH). PDSCH is used to transmit a System Information Block type 1 message. The System Information Block type 1 message is cell-specific information.

The PDSCH is used for transmission of a System Information message. The system information message includes a System Information Block X other than System Information Block type 1. The System Information message is cell-specific information.

PDSCH is used for transmission of an RRC message. Here, the RRC message transmitted from the base station apparatus may be shared by multiple terminal apparatuses in a cell. Further, the RRC message transmitted from the base station apparatus 1A may be a dedicated message to a given terminal apparatus 2 (also referred to as dedicated signaling). In other words, user-equipment-specific (UE-specific) information is transmitted using a message dedicated to the given terminal apparatus. PDSCH is used for transmission of MAC CE.

Here, the RRC message and/or MAC CE is also referred to as higher layer signaling.

PDSCH can be used to request downlink channel state information. PDSCH can be used for transmission of an uplink resource to which a CSI feedback report is mapped, the CSI feedback report being fed back to the base station apparatus by the terminal apparatus. For example, the CSI feedback report can be used for a configuration indicating uplink resource for periodically reporting Channel State Information (Periodic CSI). The CSI feedback report can be used for a mode configuration (CSI report mode) to periodically report the Channel State Information.

Examples of the type of the downlink CSI feedback report include wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers but are used by the physical layer.

The Synchronization signal is used by the terminal apparatus for synchronization of frequency and time domains in the downlink. The Downlink Reference Signal is used for the terminal apparatus to perform channel compensation on a downlink physical channel. For example, the Downlink Reference Signal is used for the terminal apparatus to calculate the downlink Channel State Information.

Here, the Downlink Reference Signals include a Cell-specific Reference Signal (CRS), a UE-specific Reference Signal (URS), a terminal apparatus-specific Reference Signal relating to PDSCH, a Demodulation Reference Signal (DMRS) relating to EPDCCH, a Non-Zero Power Channel State Information-Reference Signal (NZP CSI-RS), and a Zero Power Channel State Information-Reference Signal (ZP CSI-RS).

CRS is transmitted in the entire band of a subframe and is used to perform demodulation of PBCH/PDCCH/PHICH/PCFICH/PDSCH. URS relating to PDSCH is transmitted in a subframe and a band that are used for transmission of PDSCH to which URS relates, and is used to demodulate PDSCH to which URS relates.

DMRS relating to EPDCCH is transmitted in a subframe and a band that are used for transmission of EPDCCH to which DMRS relates. DMRS is used to demodulate EPDCCH to which DMRS relates.

A resource for NZP CSI-RS is configured by the base station apparatus 1A. The terminal apparatus 2A performs signal measurement (channel measurement), using NZP CSI-RS, for example. A resource for ZP CSI-RS is configured by the base station apparatus 1A. The base station apparatus 1A transmits ZP CSI-RS with zero output. The terminal apparatus 2A performs interference measurement in a resource to which NZP CSI-RS corresponds, for example.

A Multimedia Broadcast multicast service Single Frequency Network (MBSFN) RS is transmitted in the entire band of the subframe used for transmission of PMCH. MBSFN RS is used to demodulate PMCH. PMCH is transmitted on the antenna port used for transmission of MBSFN RS.

Here, the downlink physical channels and the downlink physical signals are also collectively referred to as a downlink signal. The uplink physical channels and the uplink physical signals are also collectively referred to as an uplink signal. The downlink physical channels and the uplink physical channels are collectively referred to as a physical channel. The downlink physical signals and the uplink physical signals are also collectively referred to as a physical signal.

BCH, UL-SCH, and DL-SCH are transport channels. Channels used in the MAC layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword and subject to coding processing or the like on a codeword basis.

The base station apparatus can multiplex multiple terminal apparatuses without dividing a resource by time, frequency, and space (e.g., antenna port, beam pattern, precoding pattern). Hereinafter, multiplexing multiple terminal apparatuses without dividing a resource by time/frequency/space is also referred to as Non Orthogonal Multiple Access (NOMA), Multiuser Superposition Transmission (MUST), or non-orthogonal multiplexing. Although a case in which two terminal apparatuses are non-orthogonally multiplexed is described below, an aspect of the present invention is not limited thereto, and three or more terminal apparatuses can also be non-orthogonally multiplexed.

The base station apparatus can transmit a shared UE-specific Reference Signal to multiple terminal apparatuses to be non-orthogonally multiplexed. In other words, the base station apparatus can transmit a Reference Signal, to the multiple terminal apparatuses, using the same resource in terms of time/frequency/space and the same Reference Signal sequence. The base station apparatus can configure a transmission mode for the terminal apparatus. The base station apparatus can perform transmission by MUST in a case of configuring a prescribed transmission mode. Further, it is possible for the base station apparatus not to perform transmission by MUST in a case of a transmission mode other than the prescribed transmission mode or that MUST is not configured. To rephrase, the terminal apparatus can determine whether the transmission is performed by MUST in accordance with the configured transmission mode, or whether MUST is configured.

The base station apparatus can configure a CRS-based transmission mode for the terminal apparatus 2B in a case that a CRS-based transmission mode is configured for the terminal apparatus 2A. Moreover, the base station apparatus can configure a CRS/DMRS-based transmission mode for the terminal apparatus 2B in a case that a DMRS-based transmission mode is configured for the terminal apparatus 2A. The CRS-based transmission mode is a transmission mode for demodulation using a CRS and is, for example, any of transmission modes 1 to 6. The transmission mode is, however, not limited to any of these transmission modes. The DMRS-based transmission mode is a transmission mode for demodulation using a UE-specific Reference Signal and is, for example, any of transmission modes 8 to 10. The transmission mode is, however, not limited to any of these transmission modes.

A description will be given by taking as an example a case in which the base station apparatus 1A in FIG. 1 non-orthogonally multiplexes the terminal apparatus 2A and the terminal apparatus 2B. Unless otherwise noted, it is assumed that the terminal apparatus 2A is closer to the base station apparatus 1A than the terminal apparatus 2B, or that the reception quality of the terminal apparatus 2A is better than that of the terminal apparatus 2B. The terminal apparatus 2A is also referred to as a terminal apparatus near the base station apparatus (near-UE), and the terminal apparatus 2B is also referred to as a terminal apparatus far from the base station apparatus (far-UE). Further, in the following description, PDSCH for the terminal apparatus 2A is also referred to as PDSCH1 (first PDSCH), and PDSCH for the terminal apparatus 2B is also referred to as PDSCH2 (second PDSCH). It is possible for each of the terminal apparatuses 2A and 2B that the terminal apparatus is configured in a MUST transmission mode or not configured in a MUST transmission mode, that MUST transmission is configured or MUST transmission is not configured, or that signal detection by R-ML or SLIC is mandatory or R-ML or SLIC is not necessary. It is also possible for each of the terminal apparatuses 2A and 2B that the terminal apparatus is a terminal capable of MUST or a terminal incapable of MUST, or that the terminal apparatus receives information about an interference signal by using a control signal or does not receive information about an interference signal by using a control signal. Although a description is mainly given of a case that the base station apparatus performs MUST through PDSCH in the following description, MUST is also applicable to other channels (e.g., PMCH, PDCCH, and EPDCCH). In a case that MUST is performed through multiple channels, different superposition transmission methods can be used among the channels, or MUST can be applied to MUST categories to be described below. In a case that MUST is performed through multiple channels, different reception methods can be presumed among the channels.

For example, a symbol-level reception method can be used for PDSCH, and a codeword-level reception method can be used for PMCH.

In the case where the base station apparatus 1A non-orthogonally multiplexes the terminal apparatuses 2A and 2B and performs transmission, several transmission methods can be used. For example, the base station apparatus 1A can perform superposition transmission for the terminal apparatuses 2A and 2B by using mapping of QPSK/16QAM/64QAM/256QAM of the same constellation. Such a superposition transmission method is also referred to as MUST category 1. In this case, the constellation combining the terminal apparatuses 2A and 2B becomes constellation of non-Gray code. Further, in this case, the base station apparatus 1A may allocate power of various ratios to the terminal apparatuses 2A and 2B. In this case, the terminal apparatus 2A presumes that the mapping pattern of the terminal apparatus 2B is the same as that of the terminal apparatus 2A itself, to cancel or suppress an interference signal.

For example, the base station apparatus 1A can perform superposition transmission using different constellations for the terminal apparatuses 2A and 2B so that the constellation combining the terminal apparatuses 2A and 2B becomes a constellation of Gray code. Such a superposition transmission method is also referred to as MUST category 2. Further, in this case, the base station apparatus 1A may allocate power of various ratios to the terminal apparatuses 2A and 2B. In this case, the terminal apparatus 2A presumes that the mapping pattern of the terminal apparatus 2B is different from that of the terminal apparatus 2A itself, to cancel or suppress an interference signal.

For example, the base station apparatus 1A can perform superposition transmission in which the transmission bit sequence addressed to the terminal apparatuses 2A and 2B is mapped so as to be a constellation of the existing QPSK/16QAM/64QAM/256QAM. Such a superposition transmission method is also referred to as MUST category 3. In this case, the base station apparatus 1A can allocate power for the terminal apparatuses 2A and 2B in accordance with the constellation for the mapping. In this case, the terminal apparatus 2A performs demodulation on existing mapping to configure part of obtained bits to be bits addressed to the terminal apparatus 2A itself.

In a case that the base station apparatus non-orthogonally multiplexes and transmits signals addressed to multiple terminal apparatuses, PDSCH1 and PDSCH2 interfere with each other. In this case, since at least the terminal apparatus 2A receives a strong interference signal, the interference signal needs to be handled, canceled, or suppressed. The above-mentioned interference signal is called multi-user interference, inter-user interference, interference due to multi-user transmission, same channel interference, or the like. In order to cancel or suppress the interference signal, an interference-signal replica signal obtained from a demodulation or decoding result of the interference signal is subtracted from the reception signal, for example. To cancel or suppress the interference signal, Symbol Level Interference Cancellation (SLIC) configured to cancel the interference based on a demodulation result of the interference signal, Codeword Level Interference Cancellation (CWIC) configured to cancel the interference based on a decoding result of the interference signal, Maximum Likelihood Detection (MLD) configured to search for the most likely signal to be transmitted among the transmission signal candidates, Enhanced Minimum Mean Square Error-Interference Rejection Combining (EMMSE-IRC) configured to suppress the interference signal by linear computation, or the like can be used.

The terminal apparatus 2A can receive parameters necessary for canceling or suppressing the interference signal from the base station apparatus, or can detect the stated parameters through blind detection. The terminal apparatus 2B may or need not cancel or suppress the interference signal. In a case that the terminal apparatus 2B does not cancel or suppress the interference signal, the terminal apparatus 2B can demodulate a signal addressed to the terminal apparatus 2B even in a case that the terminal apparatus 2B does not know the parameters associated with the interference signal because of relatively small interference signal power. In other words, in a case that the base station apparatus 1A performs non-orthogonal multiplexing for the terminal apparatuses 2A and 2B, the terminal apparatus 2A needs to have a function of canceling or suppressing the interference signal due to the non-orthogonal multiplexing, but the terminal apparatus 2B may have but does not need to have a function of canceling or suppressing the interference. To rephrase, the base station apparatus 1A can non-orthogonally multiplex a terminal apparatus supporting the non-orthogonal multiplexing and a terminal apparatus not supporting the non-orthogonal multiplexing. In other words, the base station apparatus 1A can non-orthogonally multiplex the terminal apparatuses in which different transmission modes are respectively configured. Accordingly, the communication opportunity of each terminal apparatus can be enhanced.

The base station apparatus 1A transmits, to the terminal apparatus 2A, information (assist information, auxiliary information, control information, configuration information) on the terminal apparatus that interferes (the terminal apparatus 2B in this example). The base station apparatus 1A can transmit information (MUST assist information, MUST information) on the terminal apparatus that interferes by higher layer signaling or physical layer signaling (control signal, PDCCH, EPDCCH).

The MUST assist information includes part of or all of information of PA, information of the transmission mode (transmission method), information of transmit power of the UE-specific Reference Signal, power allocation information of PDSCH, PMI, information of PA of the serving cell, information of transmit power of the UE-specific Reference Signal of the serving cell, the modulation scheme, the Modulation and Coding Scheme (MCS), a redundancy version, a Cell (C)-Radio Network Temporary Identifier (RNTI), Semi-Persistent Scheduling (SPS) C-RNTI, MUST-RNTI, information indicating whether the terminal apparatus is a terminal apparatus near the base station apparatus (near-UE) or a terminal apparatus far from the base station apparatus (far-UE), MUST category (method), codeword index, layer index, transport block index, and physical channel information.

PA is information based on a transmit power ratio (power offset) of PDSCH and CRS in an OFDM symbol where CRS is not allocated. The information of the transmission mode (transmission method) is assist information for the terminal apparatus 2A to learn (detect) the transmission mode of the interference signal, such as the interference signal transmission mode and transmission mode candidates which the base station apparatus 1A can configure (possibly configures). The transmission method is transmission diversity, Large Delay Cyclic Delay Diversity (CDD), Open-loop MIMO, Closed-loop MIMO, or the like. The codeword/layer/transport block index is information indicating the codeword/ layer/transport block to which MUST is applied in a case that transmission is performed using multiple codewords/layers/transport blocks. The physical channel information is information indicating the physical channel to which MUST is applied and can indicate PDSCH or PMCH, for example.

The terminal apparatus near the base station apparatus and the terminal apparatus far from the base station apparatus may indicate that the near-UE cancels or suppresses interference due to MUST and the far-UE does not cancel or suppress interference due to MUST. The terminal apparatus near the base station apparatus and the terminal apparatus far from the base station apparatus may indicate that smaller power is allocated to the near-UE than the far-UE. The terminal apparatus near the base station apparatus and the terminal apparatus far from the base station apparatus may indicate that the power ratio of the near UE is lower than 0.5 and the power ratio of the far-UE is 0.5 or higher. The terminal apparatus near the base station apparatus and the terminal apparatus far from the base station apparatus may indicate that the modulation order or MCS is lower for the near-UE than the far-UE.

In each of the parameters included in the MUST assist information, one value (candidate, list) may be configured, or multiple values (candidates, lists) may be configured. In the case of multiple values being configured, the terminal apparatus detects, of the multiple values, a parameter configured in the interference signal among the multiple values (that is, blind detection is performed). Part of or all of the parameters included in the above-discussed MUST assist information are transmitted by higher layer signaling. Part of or all of the parameters included in the above-discussed MUST assist information are transmitted by physical layer signaling.

In addition, the MUST assist information may be used in a case that various types of measurement are carried out. The stated measurement includes Radio Resource Management (RRM) measurement and Channel State Information (CSI) measurement.

In a case that the terminal apparatus 2A supports Carrier Aggregation (CA) in which broadband transmission is performed by combining multiple Component Carriers (CCs), the base station apparatus 1A can configure the MUST assist information for a Primary Cell (PCell) and/or a Secondary Cell (SCell). In addition, the base station apparatus 1A can configure or transmit the MUST assist information only for PCell.

In a case that the terminal apparatus 2A/2B supports Network Assisted Interference Cancellation and Suppression (NAICS) for canceling or suppressing CRS/PDSCH interference from a neighbor cell, the base station apparatus can transmit, to the terminal apparatus 2A/2B, NAICS assist information to be used for canceling interference from a neighbor cell. The NAICS assist information includes part of or all of the physical cell ID, the number of CRS antenna ports, MBSFN subframe configuration, PA list, PB, transmission mode list, and resource allocation grading. Note that PB represents the power ratio between the PDSCH of OFDM symbols to which a CRS is mapped and the PDSCH of OFDM symbols to which no CRS is mapped.

It is possible for the base station apparatus not to configure MUST assist information and NAICS assist information at the same time for the terminal apparatus. Specifically, in a case that NAICS assist information is configured, MUST assist information is not configured. In other words, in a case that MUST assist information is configured, NAICS assist information is not configured. Moreover, in a case that MUST assist information and NAICS assist information are configured at the same time, the terminal apparatus can cancel or suppress interference, based on either one of the assist information. For example, in the case that MUST assist information and NAICS assist information are configured at the same time, the terminal apparatus can cancel or suppress interference, based only on the MUST assist information or the NAICS assist information.

The terminal apparatus 2A receives the MUST assist information by the higher layer signaling and/or the physical layer signaling, detects (identifies) parameters for canceling or suppressing the interference signal based on the MUST assist information, and then cancels or suppresses the interference signal using the above parameters. Note that the terminal apparatus 2A can detect the parameters not included in the MUST information by blind detection in which detection of the parameter candidates is attempted in sequence.

For the power allocation information, a table or list is configured in the higher layer or physical layer, and the base station apparatus can indicate a power ratio to the terminal apparatus by signaling a corresponding index by physical layer signaling. The terminal apparatus can acquire the power ratio by referring to the table or list, based on the MUST configuration and index received from the base station apparatus. FIG. 2 to FIG. 6B are examples of power allocation information.

In the example in FIG. 2, power ratios correspond to eight different values. For example, in a case that the value in the table is 1, the terminal apparatus can obtain that the power ratio of the apparatus itself is 0.1 and the power ratio of the terminal apparatus paired for MUST is 1−0.1=0.9. Naturally, the power ratio for the paired terminal apparatus may also be indicated in the table. In a case that the value in the table is 0, the power ratio of the paired terminal apparatus is 0, which indicates that there is no interference signal. In other words, FIG. 2 can also indicate presence/absence of MUST interference.

In the example in FIG. 3, it is illustrated, in addition to power ratios, the apparatus itself is a far-UE in a case that the value in the table is 7. The values other than that indicate that the apparatus itself is a near-UE or there is no interference. In other words, in the example in FIG. 3, it is possible to indicate that the terminal apparatus is a near-UE or a far-UE. In a case that the terminal is indicated by the base station apparatus that the value is 7 and hence the terminal apparatus is a far-UE, the terminal apparatus can perform demodulation by using (presuming) a prescribed power ratio or the power ratio indicated by the base station apparatus.

In the example in FIG. 4, it is possible to indicate that there is no interference in a case that the value in the table is 0, indicate a near-UE and a corresponding power ratio in a case that the value is 1, 2, 3, or 4, and indicate a far-UE and a corresponding power ratio in a case that the value is 5, 6, or 7. In other words, tables for near-UE and far-UE may be different in the number of power ratio candidates and/or power ratio range. Moreover, in a case that the power ratio 0.9 is allocated to a far-UE, the base station apparatus can indicate to the terminal apparatus that the value in the table is 0 (i.e., power ratio 1.0).

In the example in FIG. 5, it is possible to indicate that there is no interference in a case that the value in the table is 0, indicate a corresponding power ratio in a case that the value is any of 1 to 6, and indicate known mapping (or MUST category 3) in a case that the value is 7. In a case of indicating known mapping, the power ratio can be obtained based on the modulation schemes (i.e., 16QAM, 64QAM, or 256QAM) for the mapping of the bit sequence of the two terminal apparatuses. In a case that the modulation scheme of a far-UE is QPSK, the power ratio can be obtained based on the modulation scheme of the apparatus itself.

In the example in FIGS. 6A and 6B, the base station apparatus indicates to the terminal apparatus whether the terminal apparatus is a near-UE or a far-UE by using a physical layer or higher layer signaling. The terminal apparatus refers to a different table according to whether a near-UE or far-UE is indicated. For example, assume that the base station apparatus indicates, to the terminal apparatus, that the value in the table is 1. In this case, in a case of near-UE, the power ratio is obtained to be 0.1; in a case of far-UE, the power ratio is obtained to be 0.9.

Note that the values in FIG. 2 to FIG. 6B are examples, and it is also possible for the base station apparatus to configure power ratio values or to use fixed values. Power ratio values that the base station apparatus can configure may be some values selected from a power ratio list (candidates) or may be configured freely by the base station apparatus.

The base station apparatus can change the contents of the downlink control information depending on transmission mode. For example, in a case of the CRS-based transmission mode, the base station apparatus transmits power allocation information by including the information in downlink control information. In a case of the DMRS-based transmission mode, the base station apparatus replaces bits used for power allocation information in a case of the CRS-based transmission mode with another information, such as antenna port of an interference signal, or PMI, for example. In other words, the terminal apparatus can obtain, from a field included in the downlink control information, power allocation information in a case of being configured in the CRS-based transmission mode and can obtain another information, such as antenna port of an interference signal, or PMI in a case of the DMRS-based transmission mode. In a case of the DMRS-based transmission mode, the terminal apparatus can obtain power allocation information from UE-specific Reference Signals for the terminal apparatus itself and the terminal apparatus to be paired for MUST.

Figure 7:
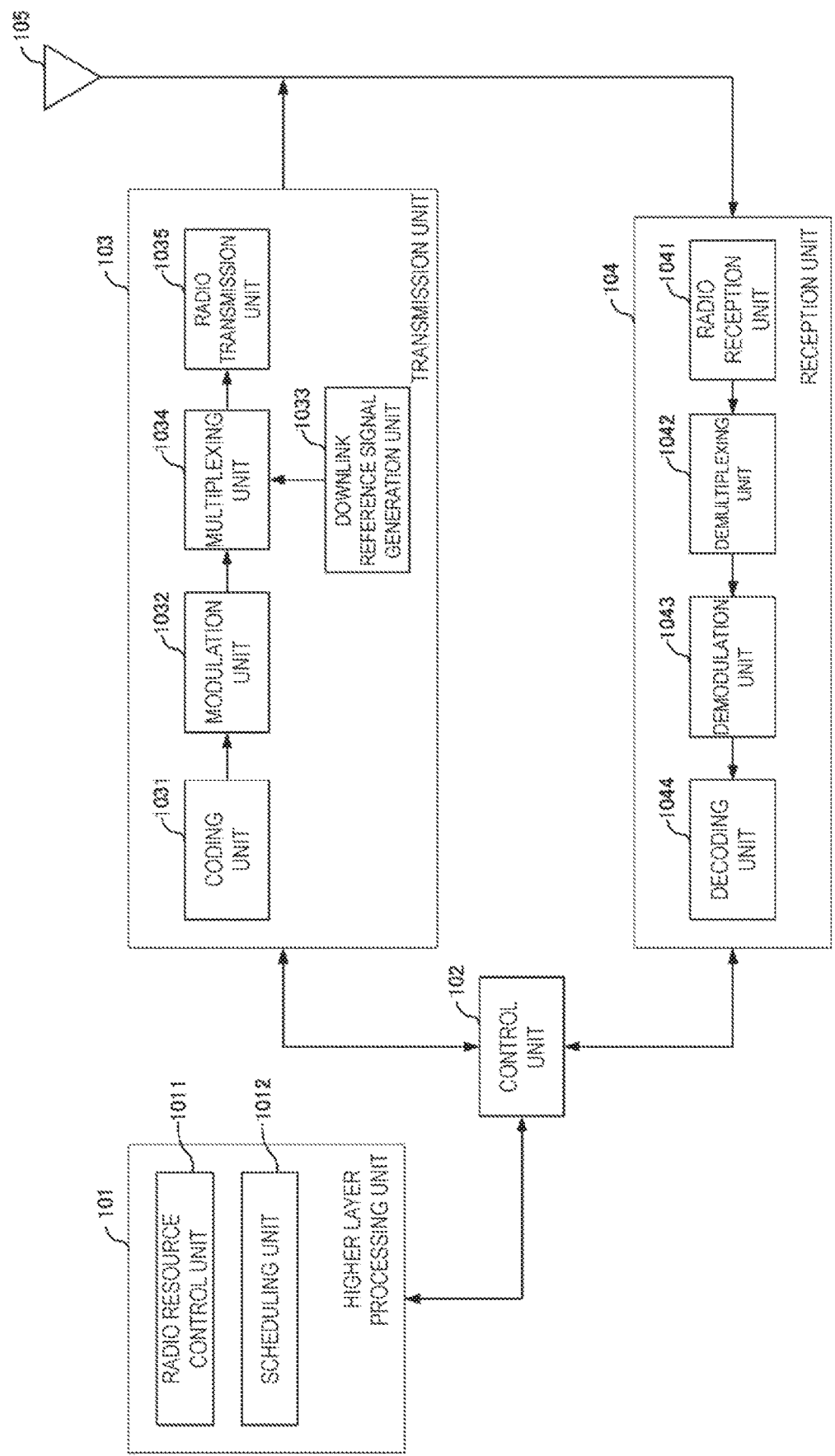
FIG. 7 is a block diagram illustrating a configuration example of a base station apparatus according to the present embodiment.

FIG. 7 is a schematic block diagram illustrating a configuration of the base station apparatus 1A according to the present embodiment. As illustrated in FIG. 7, the base station apparatus 1A is configured, including a higher layer processing unit (higher layer processing step) 101, a control unit (controlling step) 102, a transmission unit (transmitting step) 103, a reception unit (receiving step) 104, and a transmit and/or receive antenna 105. The higher layer processing unit 101 is configured, including a radio resource control unit (radio resource controlling step) 1011 and a scheduling unit (scheduling step) 1012. The transmission unit 103 is configured, including a coding unit (coding step) 1031, a modulation unit (modulating step) 1032, a Downlink Reference Signal generation unit (Downlink Reference Signal generating step) 1033, a multiplexing unit (multiplexing step) 1034, and a radio transmission unit (radio transmitting step) 1035. The reception unit 104 is configured, including a radio reception unit (radio receiving step) 1041, a demultiplexing unit (demultiplexing step) 1042, a demodulation unit (demodulating step) 1043, and a decoding unit (decoding step) 1044.

The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates information necessary for control of the transmission unit 103 and the reception unit 104, and outputs the generated information to the control unit 102.

The higher layer processing unit 101 receives information of a terminal apparatus, such as UE capability or the like, from the terminal apparatus. To rephrase, the terminal apparatus transmits its function to the base station apparatus by higher layer signaling.

Note that in the following description, information of a terminal apparatus includes information indicating whether the terminal apparatus supports a prescribed function, or information indicating that the terminal apparatus has completed the installation and test of a prescribed function. In the following description, information of whether the prescribed function is supported includes whether the installation and test of the prescribed function have been completed.

For example, in a case that a terminal apparatus supports a prescribed function, the terminal apparatus transmits information (parameters) indicating whether the prescribed function is supported. In a case that a terminal apparatus does not support a prescribed function, the terminal apparatus does not transmit information (parameters) indicating whether the prescribed function is supported. In other words, whether the prescribed function is supported is reported depending on whether information (parameters) indicating whether the prescribed function is supported is transmitted. Information (parameters) indicating whether a prescribed function is supported may be reported using one bit of 1 or 0.

For example, in a case that multiple functions corresponding to MUST are present, the terminal apparatus can transmit information indicating whether the functions are supported on a function-by-function basis. For example, functions corresponding to MUST are part of or all of capability to cancel or suppress multi-user interference (PDSCH interference), capability to correspond to multiple tables indicating antenna ports, scrambling identities and the number of layers, capability to correspond to a prescribed number of antenna ports, capability to correspond to the number of CCs of Carrier Aggregation, the number of resource blocks and the like, and capability to correspond to a prescribed transmission mode. The capability to correspond to the prescribed transmission mode is, for example, whether to support a combination of transmission modes to which MUST is applicable, a transmission mode in which interference of MUST can be canceled or suppressed, or the like. The terminal apparatus can transmit channels that the terminal apparatus supports and to which MUST is applicable, to the base station apparatus. Examples of the channels to which MUST is applicable include superposition transmission of PDSCH and PDSCH, superposition transmission of PMCH and PMCH, superposition transmission of PDCCH and PDCCH, superposition transmission of EPDCCH and EPDCCH, and the like.

The radio resource control unit 1011 generates, or acquires from a higher node, the downlink data (transport block) arranged in the downlink PDSCH, system information, the RRC message, the MAC CE, and the like. The radio resource control unit 1011 outputs the downlink data to the transmission unit 103, and outputs other information to the control unit 102. Furthermore, the radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the control unit 102.

The scheduling unit 1012 generates the information to be used for the scheduling of the physical channels (PDSCH and PUSCH), based on the result of the scheduling. The scheduling unit 1012 outputs the generated information to the control unit 102.

Based on the information input from the higher layer processing unit 101, the control unit 102 generates a control signal for controlling of the transmission unit 103 and the reception unit 104. The control unit 102 generates the downlink control information based on the information input from the higher layer processing unit 101, and outputs the generated information to the transmission unit 103.

The transmission unit 103 generates the Downlink Reference Signal in accordance with the control signal input from the control unit 102, codes and modulates the HARQ indicator, the downlink control information, and the downlink data that are input from the higher layer processing unit 101, multiplexes PHICH, PDCCH, EPDCCH, PDSCH, and the Downlink Reference Signal, and transmits a signal obtained through the multiplexing to the terminal apparatus 2 through the transmit and/or receive antenna 105.

The coding unit 1031 codes the HARQ indicator, the downlink control information, and the downlink data that are input from the higher layer processing unit 101, in compliance with the prescribed coding scheme, such as block coding, convolutional coding, or turbo coding, or in compliance with the coding scheme determined by the radio resource control unit 1011. The modulation unit 1032 modulates the coded bits input from the coding unit 1031, in compliance with the prescribed modulation scheme, such as Binary Phase Shift Keying (BPSK), quadrature Phase Shift Keying (QPSK), 16 quadrature amplitude modulation (16QAM), 64QAM, or 256QAM, or in compliance with the modulation scheme determined by the radio resource control unit 1011.

The Downlink Reference Signal generation unit 1033 generates, as the Downlink Reference Signal, a sequence that is already learned to the terminal apparatus 2A and that is acquired in accordance with a rule prescribed based on the physical cell identity (PCI, cell ID) for identifying the base station apparatus 1A, and the like.

The multiplexing unit 1034 multiplexes the modulated modulation symbols of each channel, the generated Downlink Reference Signal, and the downlink control information. To be more specific, the multiplexing unit 1034 maps the modulated modulation symbols of each channel, the generated Downlink Reference Signal, and the downlink control information to the resource elements.

The radio transmission unit 1035 performs Inverse Fast Fourier Transform (IFFT) on the modulation symbols resulting from the multiplexing or the like, generates OFDM symbols, attaches a cyclic prefix (CP) to the generated OFDM symbols, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the control unit 102, the reception unit 104 demultiplexes, demodulates, and decodes the reception signal received from the terminal apparatus 2A through the transmit and/or receive antenna 105, and outputs information resulting from the decoding to the higher layer processing unit 101.

The radio reception unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 1041 removes a portion corresponding to CP from the digital signal resulting from the conversion. The radio reception unit 1041 performs Fast Fourier Transform (FFT) on the signal from which CP has been removed, extracts a signal in the frequency domain, and outputs the resulting signal to the demultiplexing unit 1042.

The demultiplexing unit 1042 demultiplexes the signal input from the radio reception unit 1041 into PUCCH, PUSCH, and a signal such as the Uplink Reference Signal. The demultiplexing is performed based on radio resource allocation information that is determined in advance by the base station apparatus 1A using the radio resource control unit 1011 and that is included in the uplink grant notified to each of the terminal apparatuses 2.

Furthermore, the demultiplexing unit 1042 makes a compensation of channels including PUCCH and PUSCH. The demultiplexing unit 1042 demultiplexes the Uplink Reference Signal.

The demodulation unit 1043 performs Inverse Discrete Fourier Transform (IDFT) on PUSCH, acquires modulation symbols, and performs reception signal demodulation, that is, demodulates each of the modulation symbols of PUCCH and PUSCH, in compliance with the prescribed modulation scheme, such as BPSK, QPSK, 16QAM, 64QAM, 256QAM, or the like, or in compliance with the modulation scheme that the base station apparatus 1A itself notified in advance, with the uplink grant, in each of the terminal apparatuses 2.

The decoding unit 1044 decodes the coded bits of PUCCH and PUSCH, which have been demodulated, at the coding rate in compliance with a prescribed coding scheme, the coding rate being prescribed in advance or being notified in advance with the uplink grant to the terminal apparatus 2 by the base station apparatus 1A itself, and outputs the decoded uplink data and uplink control information to the higher layer processing unit 101. In a case that PUSCH is re-transmitted, the decoding unit 1044 performs the decoding with the coded bits input from the higher layer processing unit 101 and retained in an HARQ buffer, and the demodulated coded bits.

Figure 8:
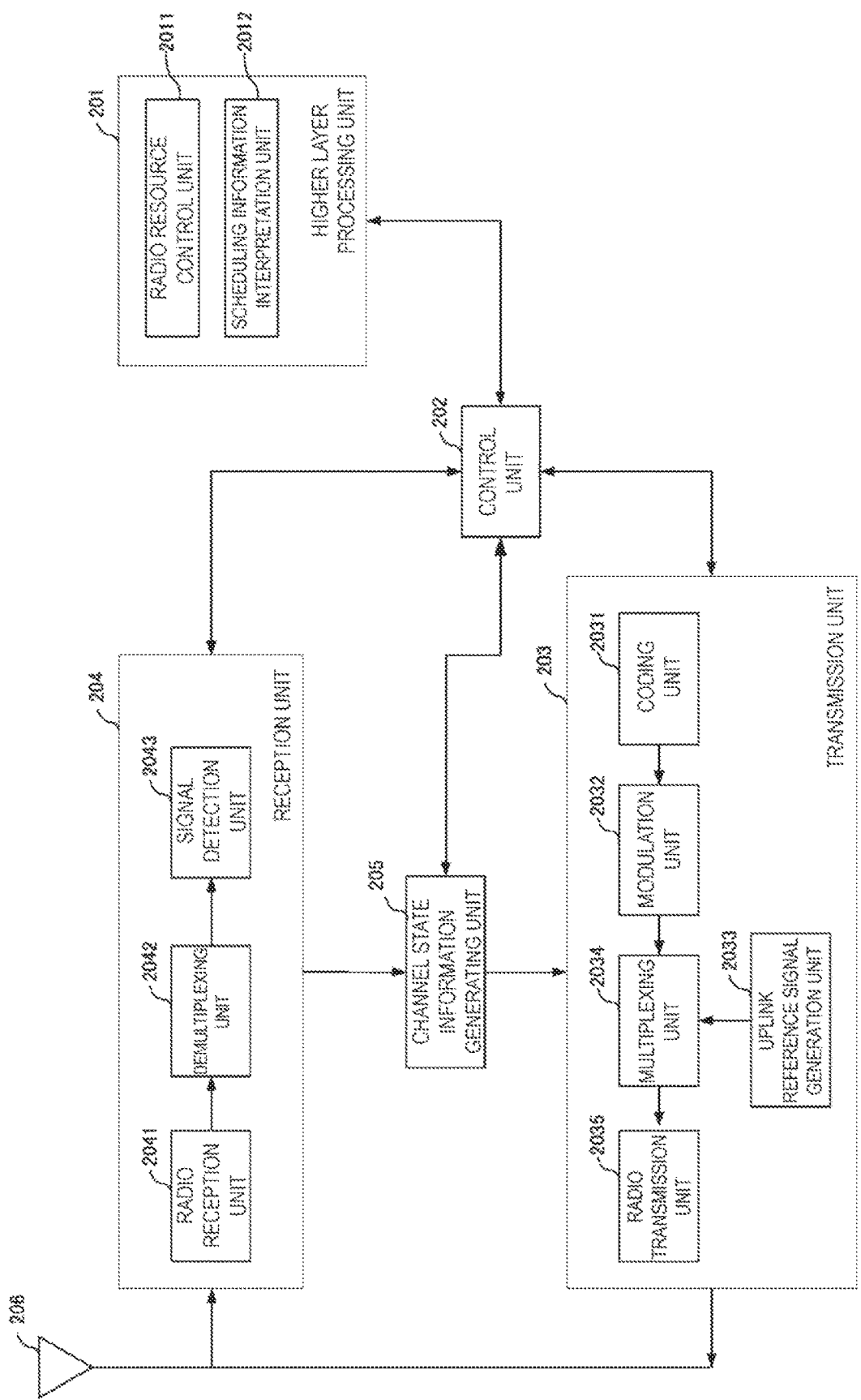
FIG. 8 is a block diagram illustrating a configuration example of a terminal apparatus according to the present embodiment.

FIG. 8 is a schematic block diagram illustrating a configuration of the terminal apparatus 2 according to the present embodiment. As illustrated in FIG. 8, the terminal apparatus 2A is configured, including a higher layer processing unit (higher layer processing step) 201, a control unit (controlling step) 202, a transmission unit (transmitting step) 203, a reception unit (receiving step) 204, a channel state information generating unit (channel state information generating step) 205, and a transmit and/or receive antenna 206. The higher layer processing unit 201 is configured, including a radio resource control unit (radio resource controlling stop) 2011 and a scheduling information interpretation unit (scheduling information interpreting step) 2012. The transmission unit 203 is configured, including a coding unit (coding step) 2031, a modulation unit (modulating step)

2032, an Uplink Reference Signal generation unit (Uplink Reference Signal generating step) 2033, a multiplexing unit (multiplexing step) 2034, and a radio transmission unit (radio transmitting step) 2035. The reception unit 204 is configured, including a radio reception unit (radio receiving step) 2041, a demultiplexing unit (demultiplexing step) 2042, and a signal detection unit (signal detecting step) 2043.

The higher layer processing unit 201 outputs the uplink data (transport block) generated by a user operation or the like, to the transmission unit 203. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmission unit 203, information indicating a terminal apparatus function supported by the terminal apparatus 2A itself.

The radio resource control unit 2011 manages various configuration information of the terminal apparatus 2A itself. Furthermore, the radio resource control unit 2011 generates information to be mapped to each uplink channel, and outputs the generated information to the transmission unit 203.

The radio resource control unit 2011 acquires configuration information of CSI feedback transmitted from the base station apparatus, and outputs the acquired information to the control unit 202.

The scheduling information interpretation unit 2012 interprets the downlink control information received through the reception unit 204 and determines scheduling information. The scheduling information interpretation unit 2012 generates the control information in order to control the reception unit 204 and the transmission unit 203 in accordance with the scheduling information, and outputs the generated information to the control unit 202.

On the basis of the information input from the higher layer processing unit 201, the control unit 202 generates a control signal for controlling the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit CSI generated by the channel state information generating unit 205 to the base station apparatus.

In accordance with the control signal input from the control unit 202, the reception unit 204 demultiplexes, demodulates, and decodes a reception signal received from the base station apparatus 1A through the transmit and/or receive antenna 206, and outputs the resulting information to the higher layer processing unit 201.

The radio reception unit 2041 converts, by down-converting, a downlink signal received through the transmit and/or receive antenna 206 into a baseband signal, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 2041 removes a portion corresponding to CP from the digital signal resulting from the conversion, performs Fast Fourier Transform on the signal from which CP has been removed, and extracts a signal in the frequency domain.

The demultiplexing unit 2042 demultiplexes the extracted signal into PHICH, PDCCH, EPDCCH, PDSCH, and the Downlink Reference Signal. Further, the demultiplexing unit 2042 makes a compensation of channels including PHICH, PDCCH, and EPDCCH based on a channel estimation value of the desired signal obtained from the channel measurement, detects the downlink control information, and outputs the information to the control unit 202. The control unit 202 outputs PDSCH and the channel estimation value of the desired signal to the signal detection unit 2043.

The signal detection unit 2043, using PDSCH and the channel estimation value, detects a signal and outputs the detected signal to the higher layer processing unit 201.

The transmission unit 203 generates the Uplink Reference Signal in accordance with the control signal input from the control unit 202, codes and modulates the uplink data (the transport block) input from the higher layer processing unit 201, multiplexes PUCCH, PUSCH, and the generated Uplink Reference Signal, and transmits a result of the multiplexing to the base station apparatus 1A through the transmit and/or receive antenna 206.

The coding unit 2031 codes the uplink control information input from the higher layer processing unit 201 in compliance with a coding scheme, such as convolutional coding or block coding. Furthermore, the coding unit 2031 performs turbo coding in accordance with information used for the scheduling of PUSCH.

The modulation unit 2032 modulates coded bits input from the coding unit 2031, in compliance with the modulation scheme notified with the downlink control information, such as BPSK, QPSK, 16QAM, or 64QAM, or in compliance with a prescribed modulation scheme for each channel.

The Uplink Reference Signal generation unit 2033 generates a sequence acquired according to a prescribed rule (formula), based on a physical cell identity (PCI, referred to as a Cell ID or the like) for identifying the base station apparatus 1A, a bandwidth to which the Uplink Reference Signal is mapped, a cyclic shift notified with the uplink grant, a parameter value for generation of a DMRS sequence, and the like.

In accordance with the control signal input from the control unit 202, the multiplexing unit 2034 rearranges modulation symbols of PUSCH in parallel and then performs Discrete Fourier Transform (DFT) on the rearranged modulation symbols. Furthermore, the multiplexing unit 2034 multiplexes PUCCH and PUSCH signals and the generated Uplink Reference Signal for each transmit antenna port. To be more specific, the multiplexing unit 2034 maps the PUCCH and PUSCH signals and the generated Uplink Reference Signal to the resource elements for each transmit antenna port.

The radio transmission unit 2035 performs Inverse Fast Fourier Transform (IFFT) on a signal resulting from the multiplexing, performs the modulation in SC-FDMA scheme, generates SC-FDMA symbols, attaches CP to the generated SC-FDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

A program running on each apparatus according to an aspect of the present invention may be a program that controls a Central Processing Unit (CPU) and the like to cause a computer to function in such a manner as to realize the functions according to the above-described embodiment relating to an aspect of the present invention. The program and information used in the program are temporarily read into a volatile memory, such as a Random Access Memory (RAM), while being processed, or are stored in a nonvolatile memory such as a flash memory or a Hard Disk Drive (HDD) and read by the CPU to be modified or rewritten, as appropriate.

Moreover, the apparatuses according to the above-described embodiment may be partially implemented by a computer. In this case, the program for implementing the function of the embodiment may be recorded on a computer-readable recording medium. The apparatuses may be implemented by causing a computer system to read and run the program recorded on the recording medium. It is assumed that the "computer system" here refers to a computer system built into the apparatuses and includes an operating system and hardware such as a peripheral device. Moreover, the "computer-readable recording medium" may be any of a semiconductor recording medium, an optical recording medium, a magnetic recording medium, and the like.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, each of the functional blocks or features of the apparatuses used in the above-described embodiment can be implemented or performed by an electric circuit, i.e., an integrated circuit or multiple integrated circuits in a typical sense. The electric circuit designed to perform each of the functions described herein may include a general-purpose processor, a digital signal processor (DSP), an application specific integrated circuit (ASIC), a field programmable gate allay (FPGA), any other programmable logical devices, a discrete gate or transistor logic, discrete hardware components, or constituent elements obtained by combining the above. The general-purpose processor may be a microprocessor, or may be a processor of known type, a controller, a micro-controller, or a state machine. The above-mentioned electric circuits may be configured of digital circuits or may be configured of analog circuits. Furthermore, in a case that with advances in semiconductor technology, a circuit integration technology with which a current integrated circuit is replaced appears, it is also possible to use an integrated circuit based on the technology.

Note that the invention of the present patent application is not limited to the above-described embodiments. In the above-described embodiment, examples of apparatuses have been described. However, the invention of the present application is not limited to the examples, and are applicable to a terminal apparatus or a communication device of a fixed-type or a stationary-type electronic apparatus installed indoors or outdoors, for example, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to an aspect of the present invention within the scope defined by claims, and embodiments that are made by suitably combining technical means disclosed according to the different embodiments are also included in the technical scope of the aspect of the present invention. Furthermore, a configuration in which a constituent element that achieves the same effect is substituted for the one that is described according to the embodiments is also included in the technical scope of the present invention.

INDUSTRIAL APPLICABILITY

The present invention can be preferably used in a base station apparatus, a terminal apparatus, and a communication method.

Note that the present international application claims priority based on JP 2015-234437 filed on Dec. 1, 2015, and the entire contents of JP 2015-234437 are incorporated in the present international application by reference.

DESCRIPTION OF REFERENCE NUMERALS

1A Base station apparatus
2A, 2B Terminal apparatus
101 Higher layer processing unit
102 Control unit
103 Transmission unit
104 Reception unit
105 Transmit and/or receive antenna
1011 Radio resource control unit
1012 Scheduling unit
1031 Coding unit
1032 Modulation unit
1033 Downlink Reference Signal generation unit
1034 Multiplexing unit
1035 Radio transmission unit
1041 Radio reception unit
1042 Demultiplexing unit
1043 Demodulation unit
1044 Decoding unit
201 Higher layer processing unit
202 Control unit
203 Transmission unit
204 Reception unit
205 Channel state information generating unit
206 Transmit and/or receive antenna
2011 Radio resource control unit
2012 Scheduling information interpretation unit
2031 Coding unit
2032 Modulation unit
2033 Uplink Reference Signal generation unit
2034 Multiplexing unit
2035 Radio transmission unit
2041 Radio reception unit
2042 Demultiplexing unit
2043 Signal detection unit

The invention claimed is:

1. A base station apparatus configured to communicate with a terminal apparatus, the base station apparatus comprising:

higher layer processing circuitry configured to transmit a radio resource control (RRC) message for configuring a multiuser superposition transmission (MUST) operation, transmission circuitry configured to transmit downlink data on a physical downlink shared channel (PDSCH) and downlink control information (DCI) on a physical downlink control channel (PDCCH), and modulation circuitry configured to take a first plurality of encoded bits in the downlink data as input and produce modulation symbols based on a modulation mapping according to a modulation scheme, wherein in a case where the RRC information indicates that the MUST is applied and the transmission circuitry transmits the DCI in one of transmission modes 8-10, the DCI includes information indicating a presence of an interference signal from an antenna port and does not include power allocation information, in a case where the RRC information indicates that the MUST is applied and the transmission circuitry transmits the DCI in one of transmission modes 2-4, the DCI includes the power allocation information, the power allocation information including one of a plurality of values related to power ratios, and in a case where the one of the plurality of values is other than a specific value, the modulation circuitry takes a the first plurality of encoded bits and a second plurality of bits as input and produces the modulation symbols based on a first ratio related to power and a second ratio related to power, the first ratio corresponding to the first plurality of encoded bits and the second ratio corresponding to the second plurality of bits, and the first ratio and the second ratio are determined based on the one of the plurality of values other than the specific value.

2. The base station apparatus according to claim 1, wherein at least the first ratio is obtained based on a modulation scheme of the modulation symbols, the modulation scheme being one of 16QAM, 64QAM, and 256QAM.

3. A communication method for a base station apparatus configured to communicate with a terminal apparatus, the communication method comprising:

transmitting a radio resource control (RRC) message for configuring a multiuser superposition transmission (MUST) operation, transmitting downlink data on a physical downlink shared channel (PDSCH) and downlink control information (DCI) on a physical downlink control channel (PDCCH), and taking a first plurality of encoded bits in the downlink data as input and producing modulation symbols based on a modulation mapping according to a modulation scheme, wherein in a case where the RRC information indicates that the MUST is applied and the DCI is transmitted in one of transmission modes 8-10, the DCI includes information indicating a presence of an interference signal from an antenna port and does not include power allocation information, in a case where the RRC information indicates that the MUST is applied and the DCI is transmitted in one of transmission modes 2-4, the DCI includes the power allocation information, the power allocation information including one of a plurality of values related to power ratios, and in a case where the one of the plurality of values is other than a specific value, the first plurality of encoded bits and a second plurality of bits are taken as input and the modulation symbols are produced based on a first ratio related to power and a second ratio related to power, the first ratio corresponding to the first plurality of bits and the second ratio corresponding to the second plurality of bits, and the power ratio and the second ratio are determined based on the one of the plurality of values other than the specific value.

4. A terminal apparatus configured to communicate with a base station apparatus, the terminal apparatus comprising:

higher layer processing circuitry configured to receive a radio resource control (RRC) message for configuring a multiuser superposition transmission (MUST) operation, reception circuitry configured to receive downlink data on a physical downlink shared channel (PDSCH) and downlink control information (DCI) on a physical downlink control channel (PDCCH), and demodulate modulation symbols for downlink data based on a modulation mapping according to a modulation scheme, the modulation symbols being produced by taking a first plurality of encoded bits as input, wherein in a case where the RRC information indicates that the MUST is applied and the reception circuitry receives the DCI in one of transmission modes 8-10, the DCI includes information indicating a presence of an interference signal from an antenna port of the base station apparatus and does not include power allocation information, in a case where the RRC information indicates that the MUST is applied and the reception circuitry receives the DCI in one of transmission modes 2-4, the DCI includes the power allocation information, the power allocation information including one of a plurality of values related to power ratios, and in a case where the one of the plurality of values is other than a specific value, the demodulation circuitry demodulates the modulation symbols, the modulation symbols being produced by taking a the first plurality of encoded bits and a second plurality of bits as input based on a first ratio related to power and a second ratio related to power, the first ratio corresponding to the first plurality of encoded bits and the second ratio corresponding to the second plurality of bits, and the first ratio and the second ratio are determined based on the one of the plurality of values other than the specific value.

5. The terminal apparatus according to claim 4, wherein at least the first ratio is obtained based on a modulation scheme of the modulation symbols, the modulation scheme being one of 16QAM, 64QAM, and 256QAM.

6. A communication method for a terminal apparatus configured to communicate with a base station apparatus, the communication method comprising:

receiving a radio resource control (RRC) message for configuring a multiuser superposition transmission (MUST) operation, receiving downlink data on a physical downlink shared channel (PDSCH) and downlink control information (DCI) on a physical downlink control channel (PDCCH), and demodulating modulation symbols for downlink data based on a modulation mapping according to a modulation scheme, the modulation symbols being produced by taking a first plurality of encoded bits as input, wherein in a case where the RRC information indicates that the MUST is applied and the DCI is received in one of transmission modes 8-10, the DCI includes information indicating a presence of an interference signal from an antenna port of the base station apparatus and does not include power allocation information, in a case where the RRC information indicates that the MUST is applied and the DCI is received in one of transmission modes 2-4, the DCI includes interference information, the interference information being power allocation information, in a case where the DCI is received in the one of transmission modes 8-10 and the power allocation information indicates one of the plurality of values other than a specific value, the modulation symbols are demodulated, the modulation symbols being produced by taking the first plurality of encoded bits and a second plurality of bits as input based on a first ratio related to power and a second ratio related to power, the first ratio corresponding to the first plurality of encoded bits and the second ratio corresponding to the second plurality of bits, and the first ratio and the second ratio are determined based on the one of the plurality of values other than the specific value, and in a case where the DCI is received in the one of transmission modes 2-4, the interference information indicates an antenna port of an interference.

7. A communication method for a terminal apparatus configured to communicate with a base station apparatus, the communication method comprising:

receiving a radio resource control (RRC) message for configuring a multiuser superposition transmission (MUST) operation, receiving downlink data on a physical downlink shared channel (PDSCH) and downlink control information (DCI) on a physical downlink control channel (PDCCH), and demodulating modulation symbols for downlink data based on a modulation mapping according to a modulation scheme, the modulation symbols being produced by taking a first plurality of encoded bits as input, wherein in a case where the RRC information indicates that the MUST is applied and the reception circuitry receives the DCI in one of transmission modes 8-10, the DCI includes information indicating a presence of an interference signal from an antenna port of the base station apparatus and does not include power allocation information, in a case where the RRC information indicates that the MUST is applied and the DCI is received in one of transmission modes 2-4, the DCI includes the power allocation information, the power allocation information including one of a plurality of values related to power ratios, and in a case where the one of the plurality of values is other than a specific value, the modulation symbols are demodulated, the modulation symbols being produced by taking the first plurality of encoded bits and a second plurality of bits as input based on a first ratio related to power and a second ratio related to power, the first ratio corresponding to the first plurality of encoded bits and the second ratio corresponding to the second plurality of bits, and the first ratio and the second ratio are determined based on the one of the plurality of values other than the specific value.

\* \* \* \* \*